(12) United States Patent
Abeta et al.

(10) Patent No.: US 8,705,420 B2
(45) Date of Patent: Apr. 22, 2014

(54) MOBILE STATION AND RADIO BASE STATION

(75) Inventors: Sadayuki Abeta, Yokohama (JP); Hiroyuki Ishii, Yokosuka (JP); Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 189 days.

(21) Appl. No.: 12/936,921

(22) PCT Filed: Sep. 24, 2009

(86) PCT No.: PCT/JP2009/066555
§ 371 (c)(1),
(2), (4) Date: Jan. 14, 2011

(87) PCT Pub. No.: WO2010/035758
PCT Pub. Date: Apr. 1, 2010

(65) Prior Publication Data
US 2011/0149771 A1 Jun. 23, 2011

(30) Foreign Application Priority Data
Sep. 26, 2008 (JP) .................. 2008-249295

(51) Int. Cl.
*H04J 11/00* (2006.01)
*H04W 4/00* (2009.01)
*H04B 1/00* (2006.01)
*H04W 36/00* (2009.01)

(52) U.S. Cl.
USPC .......... 370/310; 370/331; 370/203; 375/132; 455/436

(58) Field of Classification Search
CPC .................................................. H04W 84/18
USPC .................... 370/203, 331; 375/132; 455/436
See application file for complete search history.

(56) References Cited

U.S. PATENT DOCUMENTS

2003/0063655 A1* 4/2003 Young ........................ 375/132
2004/0165650 A1   8/2004 Miyazaki et al.
(Continued)

FOREIGN PATENT DOCUMENTS

JP    2001-268064 A    9/2001
JP    2004-253899 A    9/2004
(Continued)

OTHER PUBLICATIONS

Korean Office Action for Application No. 10-2010-7022378, mailed on Jan. 10, 2011 (6 pages).

(Continued)

*Primary Examiner* — Ian N Moore
*Assistant Examiner* — Kiet Tang
(74) *Attorney, Agent, or Firm* — Osha Liang LLP

(57) ABSTRACT

A mobile station (UE) according to the present invention includes: a CP length determiner unit (15) configured to determine a length of a CP to be inserted in an uplink signal; and a CP adder unit (14) configured to generate the uplink signal by adding a CP to any one of an inputted signal modulated by DFT-Spread OFDM (Single Carrier FDMA) scheme and an inputted signal modulated OFDM scheme, the CP having the length determined by the CP length determiner unit (15), wherein the cyclic prefix length determiner unit (15) is configured to be capable of setting the length of the CP to be inserted in the uplink signal independently of a length of a CP inserted in a downlink signal.

2 Claims, 5 Drawing Sheets

(56) References Cited

U.S. PATENT DOCUMENTS

2005/0288020 A1* 12/2005 Cho et al. .................. 455/436
2006/0087961 A1* 4/2006 Chang et al. ............... 370/203
2009/0129335 A1* 5/2009 Lee et al. ................... 370/331
2009/0285327 A1 11/2009 Iwai et al.

FOREIGN PATENT DOCUMENTS

KR 20080085321 A 9/2008
WO 2007/148796 A1 12/2007

OTHER PUBLICATIONS esp@cenet Patent Abstract for Korean Publication No. 20080085321, publication date Sep. 24, 2008. (1 page).
International Search Report w/translation from PCT/JP2009/066555 dated Jan. 12, 2010 (3 pages).
Written Opinion from PCT/JP2009/066555 dated Jan. 12, 2010 (3 pages).
3GPP TS 36.211 V8.4.0; "3rd Generation Partnership Project; Technical Specification Group Radio Access Network; Evolved Universal Terrestrial Radio Access (E-UTRA); Physical Channels and Modulation"; Sep. 2008 (78 pages).
3GPP TS 36.331, V8.3.0; "3rd Generation Partnership Project; Technical Specification Group Radio Access Network; Evolved Universal Terrestrial Radio Access (E-UTRA) Radio Resource Control (RRC); Protocol specification"; Sep. 2008 (178 pages).
Office Action for Australian Patent Application No. 2009297569 dated May 31, 2012 (2 pages).
Office Action for Chinese Application No. 200980113180.1 issued Feb. 13, 2012, with English translation thereof (7 pages).
Office Action for Chinese Patent Application No. 200980113180.1 issued Jul. 31, 2012, with English translation thereof (8 pages).
Office Action for Russian Office Action for Russian Application No. 2010140983/07 dated Jun. 1, 2012, with English translation thereof (8 pages).
Office Action for Canadian Application No. 2,720,649 dated Jan. 25, 2013 (4 pages).

* cited by examiner

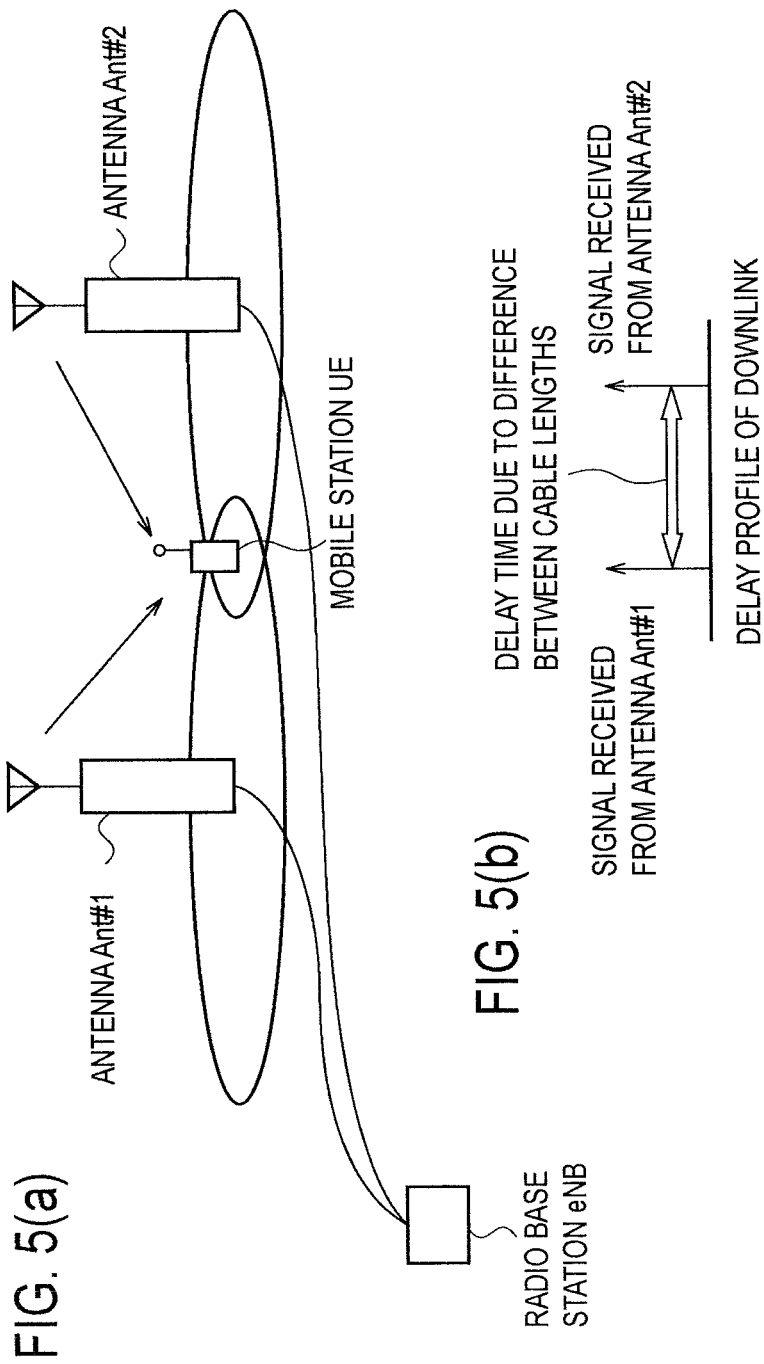

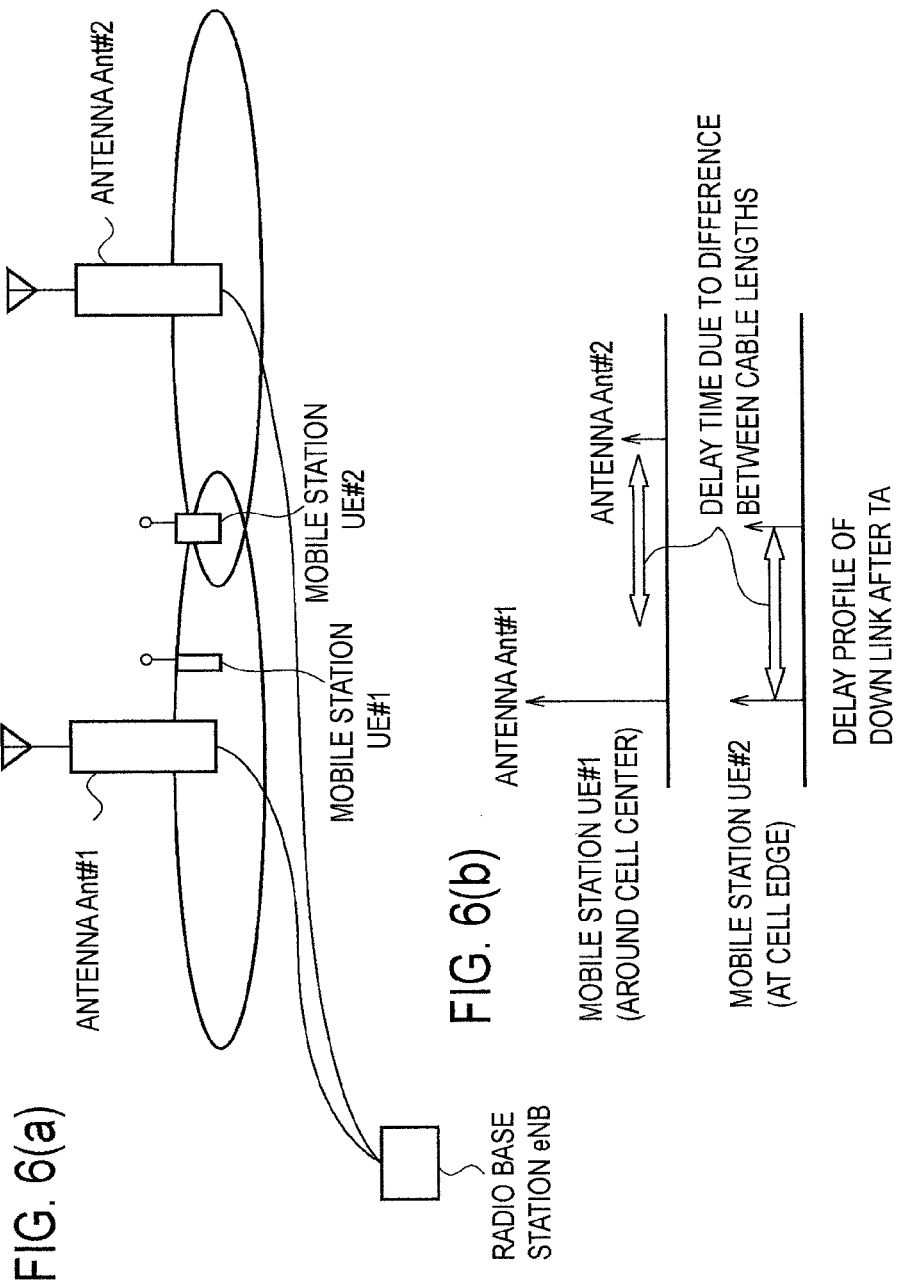

MOBILE STATION AND RADIO BASE STATION

TECHNICAL FIELD

The present invention relates to a mobile station and a radio base station.

BACKGROUND ART

In order to remove multipath interference, CP (Cyclic Prefix) is used in mobile communication systems based on the OFDM (Orthogonal Frequency Division Multiplexing) scheme and the DFT-Spread OFDM (Discrete Fourier Transform Spread OFDM) scheme, such as LTE (Long Term Evolution) scheme, WiFi (Wireless Fidelity) scheme, and WiMAX (Worldwide Interoperability for Microwave Access) scheme.

In such mobile communication system, CP with the same length is used for an uplink and a downlink based on an assumption that delay profiles of both links are substantially the same.

DISCLOSURE OF THE INVENTION

Problems to be Solved by the Invention

When a radio base station eNB transmits the same information via multiple antennas Ant#1 and Ant#2 as shown in FIG. 5(a) in the above-mentioned mobile communication system, either of the signals transmitted from the antennas Ant#1 and Ant#2 is observed as a delay wave by a mobile station UE as shown in FIG. 5(b) due to a difference between the cable lengths from the radio base station eNB to the antennas Ant#1, Ant#2.

Here, at the mobile station UE, the interference by the downlink signal transmitted from the antenna Ant#2 accounts for a large proportion of the interference and noise component in the downlink signal transmitted from the antenna Ant#1, while the interference by the downlink signal transmitted from the antenna Ant#1 accounts for a large proportion of the interference and noise component in the downlink signal transmitted from the antenna Ant#2. Thus, SINR can be increased by inserting "Extended CP" to the downlink signal.

On the other hand, also in the uplink, as shown in FIGS. 6(a) and 6(b), uplink signals from a mobile station UE#1 received by respective antennas Ant#1 and Ant#2 are affected not only by the interference due to an uplink signal from a mobile station UE#2, but also by noise and/or other-cell interference, because transmission power of the uplink signal in each mobile station UE is limited. Thus, the effect achieved by inserting "Extended CP" to the downlink signal transmitted by each mobile station UE is not as significant as the effect achieved by inserting "Extended CP" to the uplink signal.

On the contrary, inserting "Extended CP" to the uplink, i.e., increasing the length of the CP causes an increase in the overhead and a reduction in the uplink communication capacity. Thus, this approach has a problem in that the negative effect is highly likely to be greater than the positive effect.

The present invention is made in view of the above mentioned problem, and it is an object of the present invention to provide a mobile station and a radio base station capable of flexibly changing lengths of CP used for the uplink and the downlink.

Solution to Problem

A first aspect of the present invention is summarized as a mobile station including: a cyclic prefix length determiner unit configured to determine a length of a cyclic prefix to be inserted in an uplink signal; and a cyclic prefix adder unit configured to generate the uplink signal by adding a cyclic prefix to any one of an inputted signal modulated by DFT-Spread OFDM (Single Carrier FDMA) scheme and an inputted signal modulated OFDM scheme, the cyclic prefix having the length determined by the cyclic prefix length determiner unit, wherein the cyclic prefix length determiner unit is configured to be capable of setting the length of the cyclic prefix to be inserted in the uplink signal independently of a length of a cyclic prefix inserted in a downlink signal.

In the first aspect, the cyclic prefix length determiner unit can be configured to set the length of the cyclic prefix to be inserted in the uplink signal to a length specified in broadcast information transmitted by a radio base station.

In the first aspect, the cyclic prefix length determiner unit can be configured to set the length of the cyclic prefix to be inserted in the uplink signal to a length specified in dedicated control information transmitted by a radio base station at a time of a handover.

A second aspect of the present invention is summarized as a radio base station configured to receive an uplink signal from a mobile station in a predetermined cell, the uplink signal being generated by adding a cyclic prefix to any one of a signal modulated by DFT-Spread OFDM (Single Carrier FDMA) scheme and a signal modulated by OFDM scheme, wherein the radio base station is configured to specify a length of the cyclic prefix to be inserted in the uplink signal, for the mobile station in the predetermined cell, by broadcast information.

A third aspect of the present invention is summarized as a radio base station configured to receive an uplink signal from a mobile station in a predetermined cell, the uplink signal being generated by adding a cyclic prefix to any one of a signal modulated by DFT-Spread OFDM (Single Carrier FDMA) scheme and a signal modulated by OFDM scheme, wherein the radio base station is configured to specify a length of the cyclic prefix to be inserted in the uplink signal, for a mobile station which performs a handover from another cell to the predetermined cell, by dedicated control information.

BRIEF DESCRIPTION OF THE DRAWINGS

FIG. 5 is a diagram for illustrating a problem of a mobile communication system of conventional LTE scheme.

FIG. 6 is another diagram for illustrating the problem of the mobile communication system of conventional LTE scheme.

BEST MODE FOR CARRYING OUT THE INVENTION (Mobile Communication System According to First Embodiment of the Present Invention)

Referring to FIGS. 1 to 4, a mobile communication system according to a first embodiment of the present invention is described.

Figure 1:
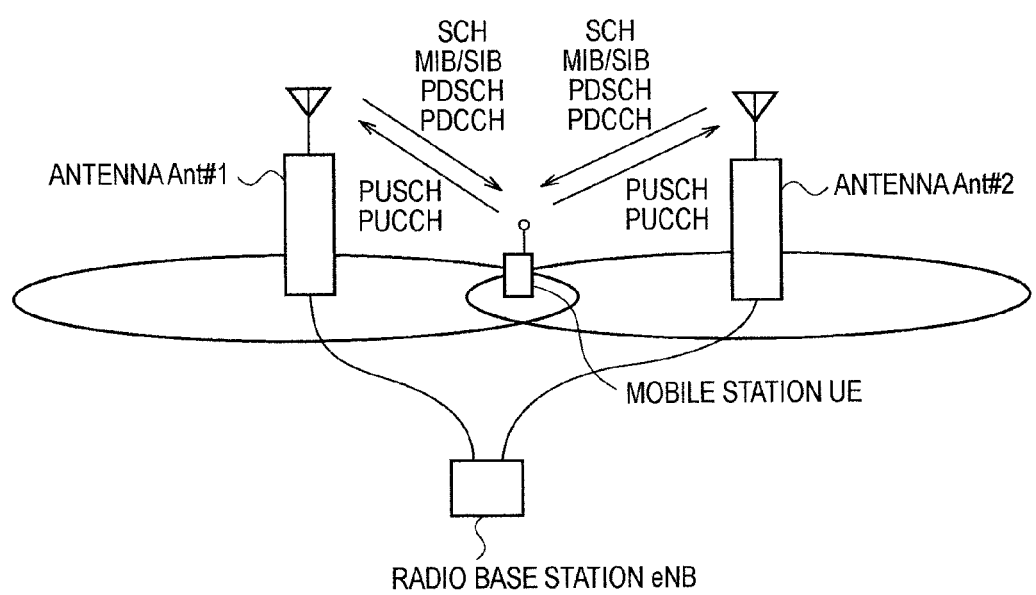
FIG. 1 is an entire configuration diagram of a mobile communication system according to a first embodiment of the present invention.

As shown in FIG. 1, the mobile communication system according to the present embodiment is a mobile communication system of the LTE scheme, and includes a radio base station eNB having antennas Ant#1 and Ant#2, and a mobile station UE.

Also, the mobile communication system according to the present embodiment is configured so that, as a radio access scheme, the OFDM scheme is applied to the downlink, and the "SC-FDMA (Single-Carrier Frequency Division Multiple Access) scheme" is applied to the uplink.

The OFDM scheme is a scheme that divides a specific frequency band into multiple narrow frequency bands (subcarriers) and transmits data over each frequency band. According to the OFDM scheme with such feature, high speed transmission can be achieved, and utilization efficiency of the frequency can be increased, by densely arranging subcarriers on a frequency axis without interfering with each other while allowing partial overlap between them.

Also, the SC-FDMA scheme is a transmission scheme that can achieve less interference between multiple mobile stations UE, by dividing a specific frequency band, and performing transmission using different frequency bands between multiple mobile stations UE. According to the SC-FDMA scheme, lower power consumption and larger coverage by the mobile station UE can be achieved, because the SC-FDMA scheme has a feature that fluctuation in transmission power is reduced.

According to the mobile communication system according to the present embodiment, in the uplink, an uplink data signal is transmitted via e.g., PUSCH (Physical Uplink Shared Channel), and an uplink control signal is transmitted via e.g., PUCCH (Physical Uplink Control Channel).

On the other hand, in the downlink, a synchronization signal is transmitted via e.g., SCH (Synchronization Channel), a downlink data signal is transmitted via e.g., PDSCH (Physical Downlink Shared Channel), and a downlink control signal is transmitted via e.g., PDCCH (Physical Downlink Control Channel).

Figure 2:
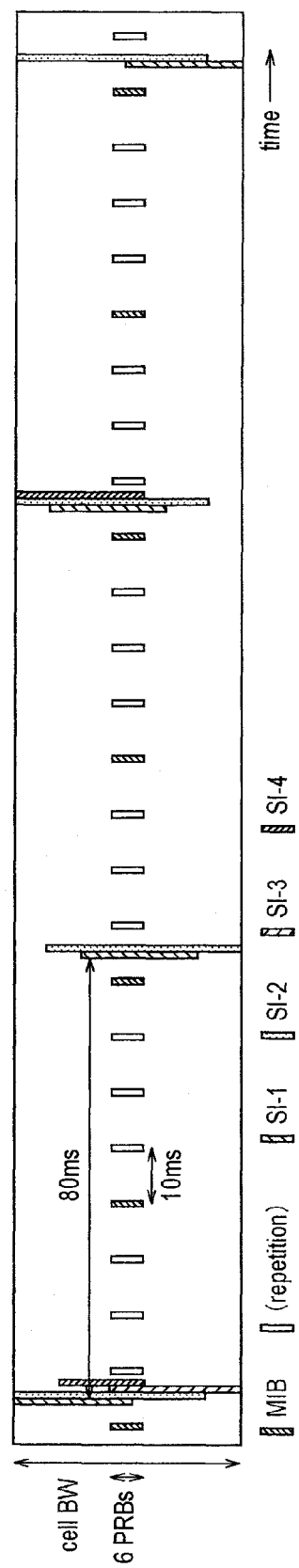
FIG. 2 is a diagram showing an example of broadcast information transmitted by a radio base station according to the first embodiment of the present invention.

Also, in the downlink, an MIB (Master Information Block) is configured to be transmitted as broadcast information in each cell via e.g., PBCH (Physical Broadcast Channel), and SIB (System Information Block) 1 to 11 are configured to be transmitted via e.g., PDSCH (see. FIG. 2).

Specifically, the MIB is configured to include physical parameters such as a cell bandwidth and transmission antenna identification information, and a system frame number (SFN), and is configured to be transmitted in a period of 40 ms.

Also, the SIB1 is configured to be mapped to SI (System Information)-1 and is configured to be transmitted in a period of 80 ms. In addition, the SIB1 is configured to include PLMN-ID, TAC, a cell ID, cell border information "value tag", and scheduling data of other SI, etc.

Also, the SIB2 to the SIB8 are configured to be mapped to any one of SI-x and transmitted. For such SIB2 to SIB4, a transmission period can be set. For example, the SIB2 is configured to include common channel information and shared channel information, the SIB3 is configured to include cell re-selection information, and the SIB4 to the SIB8 are configured to include information of adjacent cells in the same frequency, information of adjacent cells in different frequencies, and the like.

The radio base station eNB is configured to specify the length of the CP to be inserted in an uplink signal (e.g., uplink data signal, and/or uplink control signal) for the mobile station UE in a predetermined cell (a cell under the control of the radio base station eNB) by the above-mentioned broadcast information. For example, the radio base station eNB is configured to make such specification by using the MIB, the SIB1, the SIB2, etc.

Also, the radio base station eNB may be configured to specify, by dedicated control information (e.g., RRC Connection Reconfiguration), the length of the CP to be inserted in an uplink signal in the predetermined cell for the mobile station UE which performs a handover from another cell to the predetermined cell (cell under the control of the radio base station eNB).

Figure 3:
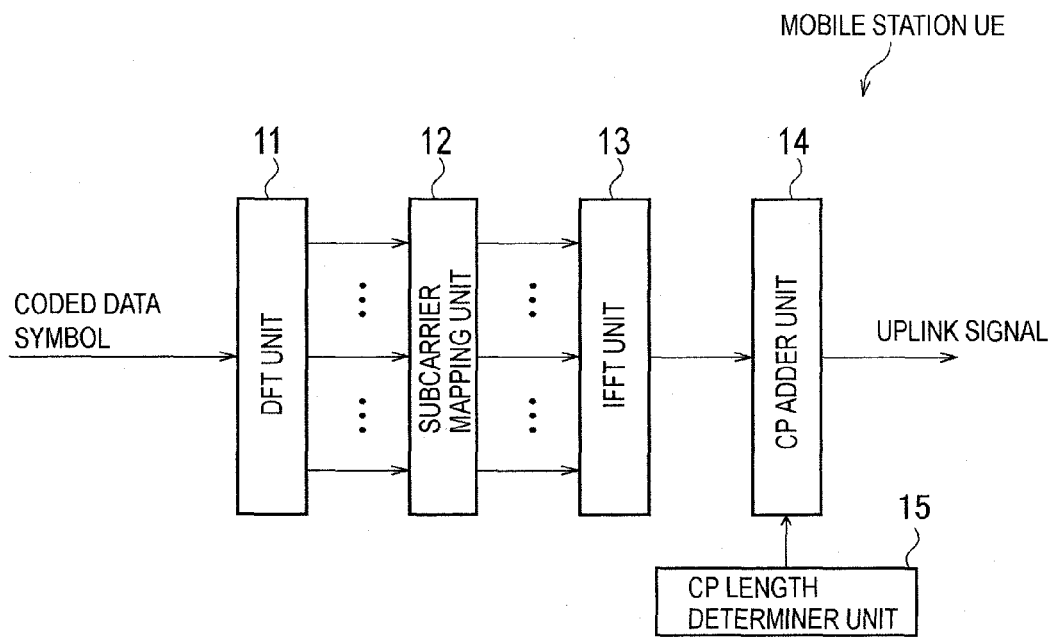
FIG. 3 is a functional block diagram of a mobile station according to the first embodiment of the present invention.

FIG. 3 shows a portion of transmission configuration of an uplink transmission signal, out of the configuration of a mobile station UE according to the present embodiment. As shown in FIG. 3, the mobile station UE includes a DFT (Discrete Fourier Transformer) unit 11, a subcarrier mapping unit 12, an IFFT (Inversed Fast Fourier Transformer) unit 13, a CP adder unit 14, and a CP length determiner unit 15.

Coded data symbol is configured to be DFT-processed by DFT unit 11, and be inputted to the subcarrier mapping unit 12.

The subcarrier mapping unit 12 is configured to map an output signal (symbol) from the DFT unit 11 on continuous subcarriers.

The IFFT unit 13 is configured to perform IFFT processing on an output signal from the subcarrier mapping unit 12 (symbol y), and output a signal modulated by the DFT-Spread OFDM scheme to the CP adder unit 14.

The CP adder unit 14 is configured to generate an uplink signal by adding a CP to the input signal modulated by the DFT-Spread OFDM scheme, the CP having the length determined by the CP length determiner unit 15.

Figure 4:
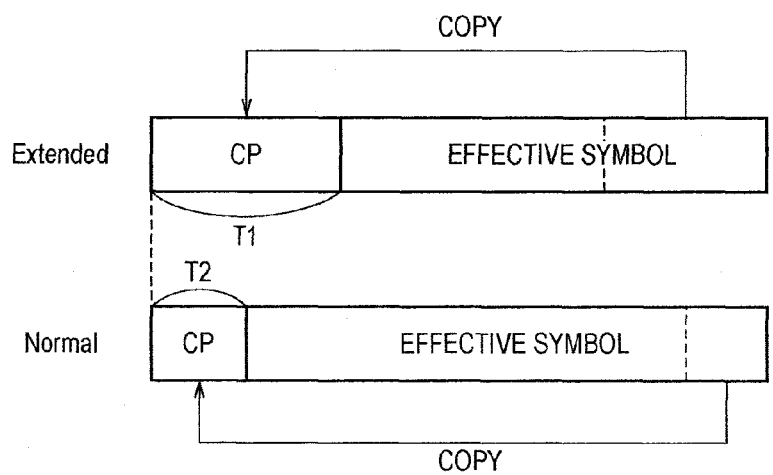
FIG. 4 is a diagram showing an example of CP used in the mobile station according to the first embodiment of the present invention.

Now, as shown in FIG. 4, the CP to be inserted in the uplink signal is assumed to have two types: "Normal CP" and "Extended CP". The length T1 of "Extended CP" is longer than the length T2 of "Normal CP".

Both "Normal CP" and "Extended CP" are generated by copying a portion of an effective symbol. The CP may be called GI (Guard Interval).

The CP length determiner unit 15 is configured to determine the length of the CP to be inserted in the uplink signal.

The CP length determiner unit 15 is configured to be capable of setting the length of the CP to be inserted in the uplink signal (e.g., uplink data signal and/or uplink control signal) independently of the length of the CP inserted in the downlink signal (e.g., downlink data signal and/or downlink control signal).

The length of the CP to be inserted in the uplink signal, and the length of the CP inserted in the downlink signal (e.g., downlink data signal and/or downlink control signal) may be set to the same length, or may be set to different lengths.

The mobile station UE can calculate the length of the CP inserted in the downlink signal, by using a synchronization signal received via the SCH.

Specifically, the CP length determiner unit 15 may be configured to set the length of the CP to be inserted in the uplink signal to the length specified in the broadcast information (e.g., the MIB, the SIB1, the SIB2, etc.) transmitted by the radio base station eNB.

Also, the CP length determiner unit 15 may be configured to set the length of the CP to be inserted in the uplink signal to the length specified in the dedicated control information (e.g., RRC Connection Reconfiguration) transmitted by the radio base station eNB at the time of a handover.

(Operations and Effects of Mobile Communication System According to First Embodiment of the Present Invention)

According to the mobile communication system of the present embodiment, the mobile station UE sets the length of the CP to be inserted in the uplink signal to the length specified in the broadcast information (e.g., MIB, SIB1, SIB2 etc.) transmitted by the radio base station eNB, so that it is possible to make the length of the CP applied in the uplink and the length of the CP applied in the downlink different.

Also, according to the mobile communication system of the present embodiment, the mobile station UE sets the length of the CP to be inserted in the uplink signal to the length specified in the individual control information (e.g., RRC Connection Reconfiguration) transmitted by the radio base station eNB, so that it is possible to make the length of the CP applied in the uplink and the length of the CP applied in the downlink different.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station comprising:
   a cyclic prefix length determiner unit configured to determine a length of a cyclic prefix to be inserted in an uplink signal; and
   a cyclic prefix adder unit configured to generate the uplink signal by adding a cyclic prefix to any one of an inputted signal modulated by DFT-Spread OFDM (Single Carrier FDMA) scheme and an inputted signal modulated OFDM scheme, the cyclic prefix having the length determined by the cyclic prefix length determiner unit, wherein
   the cyclic prefix length determiner unit is configured to be capable of setting the length of the cyclic prefix to be inserted in the uplink signal independently of a length of a cyclic prefix inserted in a downlink signal, and wherein
   the cyclic prefix length determiner unit is configured to set the length of the cyclic prefix to be inserted in the uplink signal to a length specified in broadcast information transmitted by a radio base station, and
   the broadcast information comprises cell bandwidth, transmission antenna identification information, a system frame number (SFN), common channel information, and shared channel information.

2. A radio base station comprising:
   a processor for receiving an uplink signal from a mobile station in a predetermined cell, the uplink signal being generated by adding a cyclic prefix to any one of a signal modulated by DFT-Spread OFDM (Single Carrier FDMA) scheme and a signal modulated by OFDM scheme,
   wherein the radio base station is configured to specify a length of the cyclic prefix to be inserted in the uplink signal, for the mobile station in the predetermined cell, by broadcast information, and
   wherein the broadcast information comprises cell bandwidth, transmission antenna identification information, a system frame number (SFN), common channel information, and shared channel information.

* * * * *